(12) United States Patent
Kim (10) Patent No.: US 9,081,084 B2
(45) Date of Patent: Jul. 14, 2015

(54) ULTRASOUND SYSTEM AND METHOD FOR PROCESSING BEAM-FORMING BASED ON SAMPLING DATA

(75) Inventor: Min Woo Kim, Seoul (KR)

(73) Assignee: SAMSUNG MEDISON CO., LTD., Kangwon-do (KR)

( * ) Notice: Subject to any disclaimer, the term of this patent is extended or adjusted under 35 U.S.C. 154(b) by 193 days.

(21) Appl. No.: 13/327,243

(22) Filed: Dec. 15, 2011

(65) Prior Publication Data

US 2012/0157847 A1  Jun. 21, 2012

(30) Foreign Application Priority Data

Dec. 17, 2010  (KR) .................. 10-2010-0129665

(51) Int. Cl.
  *A61B 8/00*   (2006.01)
  *G01S 7/52*   (2006.01)
  *G10K 11/34*  (2006.01)
  *G01S 15/89*  (2006.01)

(52) U.S. Cl.
  CPC ......... *G01S 7/52046* (2013.01); *G01S 7/52034* (2013.01); *G01S 15/8915* (2013.01); *G10K 11/341* (2013.01)

(58) Field of Classification Search
  CPC ........... G06T 2207/30004; G06T 2207/10132; G10K 11/346; G10K 11/341; G01S 7/52095; G01S 7/52046; G01S 7/52034; G01S 15/8915
  USPC ................................................. 600/437–463
  See application file for complete search history.

(56) References Cited

U.S. PATENT DOCUMENTS

| 6,088,295 | A | * | 7/2000 | Altes ............................ 367/103 |
| 6,592,523 | B2 | * | 7/2003 | Avinash et al. ............... 600/443 |
| 2007/0038106 | A1 | | 2/2007 | Kim et al. |

FOREIGN PATENT DOCUMENTS

| EP | 2 101 191 A2 | 9/2009 |
| JP | 2003-061956 A | 3/2003 |
| JP | 2009-000361 A | 1/2009 |
| KR | 10-2007-0014099 A | 1/2007 |
| KR | 10-2008-0015082 A | 2/2008 |
| WO | WO 2006/113445 A1 | 10/2006 |
| WO | 2009/026534 A1 | 2/2009 |

OTHER PUBLICATIONS

Korean Office Action issued in Korean Application No. 10-2010-0129665 issued on Jun. 19, 2012.
Korean Office Action issued in Korean Patent Application No. KR 10-2010-0129665 dated Jan. 23, 2013.

(Continued)

*Primary Examiner* — Elmer Chao
(74) *Attorney, Agent, or Firm* — McDermott Will & Emery LLP (57) ABSTRACT

Embodiments of performing beam forming processing based on sampling data in an ultrasound system are disclosed. The ultrasound system includes an ultrasound data acquisition unit configured to form a receive signal based on an ultrasound signal reflected from a target object, perform an analog-to-digital conversion on the receive signal to form sampling data, select pixels, which the respective sampling data are used as pixel values thereof among the plurality of pixels, cumulatively assign the corresponding sampling data to the selected pixels and perform beam forming upon the cumulatively assigned sampling data for the respective pixels to form receive-focused data.

8 Claims, 8 Drawing Sheets

(56) References Cited

OTHER PUBLICATIONS

Extended European Search Report issued in European Application No. 11193761.1 dated Oct. 14, 2013.

Fritsch et al., "Beamforming with a reduced sampling rate", Ultrasonics, vol. 40, (2002), pp. 599-604.

* cited by examiner

| $S_{1,t}$ | $S_{2,t}$ | $S_{3,t}$ | $S_{4,t}$ | $S_{5,t}$ | $S_{6,t}$ | $S_{7,t}$ | $S_{8,t}$ | $S_{9,t}$ | $S_{10,t}$ | $S_{11,t}$ | ... | $S_{p,t}$ |
|---|---|---|---|---|---|---|---|---|---|---|---|---|
| ⋮ | ⋮ | ⋮ | ⋮ | ⋮ | ⋮ | ⋮ | ⋮ | ⋮ | ⋮ | ⋮ | | ⋮ |
| $S_{1,6}$ | $S_{2,6}$ | $S_{3,6}$ | $S_{4,6}$ | $S_{5,6}$ | $S_{6,6}$ | $S_{7,6}$ | $S_{8,6}$ | $S_{9,6}$ | $S_{10,6}$ | $S_{11,6}$ | ... | $S_{p,6}$ |
| $S_{1,5}$ | $S_{2,5}$ | $S_{3,5}$ | $S_{4,5}$ | $S_{5,5}$ | $S_{6,5}$ | $S_{7,5}$ | $S_{8,5}$ | $S_{9,5}$ | $S_{10,5}$ | $S_{11,5}$ | ... | $S_{p,5}$ |
| $S_{1,4}$ | $S_{2,4}$ | $S_{3,4}$ | $S_{4,4}$ | $S_{5,4}$ | $S_{6,4}$ | $S_{7,4}$ | $S_{8,4}$ | $S_{9,4}$ | $S_{10,4}$ | $S_{11,4}$ | ... | $S_{p,4}$ |
| $S_{1,3}$ | $S_{2,3}$ | $S_{3,3}$ | $S_{4,3}$ | $S_{5,3}$ | $S_{6,3}$ | $S_{7,3}$ | $S_{8,3}$ | $S_{9,3}$ | $S_{10,3}$ | $S_{11,3}$ | ... | $S_{p,3}$ |
| $S_{1,2}$ | $S_{2,2}$ | $S_{3,2}$ | $S_{4,2}$ | $S_{5,2}$ | $S_{6,2}$ | $S_{7,2}$ | $S_{8,2}$ | $S_{9,2}$ | $S_{10,2}$ | $S_{11,2}$ | ... | $S_{p,2}$ |
| $S_{1,1}$ | $S_{2,1}$ | $S_{3,1}$ | $S_{4,1}$ | $S_{5,1}$ | $S_{6,1}$ | $S_{7,1}$ | $S_{8,1}$ | $S_{9,1}$ | $S_{10,1}$ | $S_{11,1}$ | ... | $S_{p,1}$ |
| $CH_1$ | $CH_2$ | $CH_3$ | $CH_4$ | $CH_5$ | $CH_6$ | $CH_7$ | $CH_8$ | $CH_9$ | $CH_{10}$ | $CH_{11}$ | ... | $CH_p$ |

| $P_{1,1}$ | $P_{1,2}$ | $P_{1,3}$ | $P_{1,4}$ | $P_{1,5}$ | $P_{1,6}$ | $P_{1,7}$ | $P_{1,8}$ | $P_{1,9}$ | ... | $P_{1,N}$ |
|---|---|---|---|---|---|---|---|---|---|---|
| $P_{2,1}$ | $P_{2,2}$ | $P_{2,3}$ | $P_{2,4}$ | $P_{2,5}$ | $P_{2,6}$ | $P_{2,7}$ | $P_{2,8}$ | $P_{2,9}$ | ... | $P_{2,N}$ |
| $P_{3,1}$ | $P_{3,2}$ | $P_{3,3}$ | $P_{3,4}$ | $P_{3,5}$ | $P_{3,6}$ | $P_{3,7}$ | $P_{3,8}$ | $P_{3,9}$ | ... | $P_{3,N}$ |
| $P_{4,1}$ | $P_{4,2}$ | $P_{4,3}$ | $P_{4,4}$ | $P_{4,5}$ | $P_{4,6}$ | $P_{4,7}$ | $P_{4,8}$ | $P_{4,9}$ | ... | $P_{4,N}$ |
| $P_{5,1}$ | $P_{5,2}$ | $P_{5,3}$ | $P_{5,4}$ | $P_{5,5}$ | $P_{5,6}$ | $P_{5,7}$ | $P_{5,8}$ | $P_{5,9}$ | ... | $P_{5,N}$ |
| $P_{6,1}$ | $P_{6,2}$ | $P_{6,3}$ | $P_{6,4}$ | $P_{6,5}$ | $P_{6,6}$ | $P_{6,7}$ | $P_{6,8}$ | $P_{6,9}$ | ... | $P_{6,N}$ |
| $P_{7,1}$ | $P_{7,2}$ | $P_{7,3}$ | $P_{7,4}$ | $P_{7,5}$ | $P_{7,6}$ | $P_{7,7}$ | $P_{7,8}$ | $P_{7,9}$ | ... | $P_{7,N}$ |
| ⋮ | ⋮ | ⋮ | ⋮ | ⋮ | ⋮ | ⋮ | ⋮ | ⋮ | | ⋮ |
| $P_{M,1}$ | $P_{M,2}$ | $P_{M,3}$ | $P_{M,4}$ | $P_{M,5}$ | $P_{M,6}$ | $P_{M,7}$ | $P_{M,8}$ | $P_{M,9}$ | ... | $P_{M,N}$ |

| $S_{1,t}$ | $S_{2,t}$ | $S_{3,t}$ | $S_{4,t}$ | $S_{5,t}$ | $S_{6,t}$ | $S_{7,t}$ | $S_{8,t}$ | $S_{9,t}$ | $S_{10,t}$ | $S_{11,t}$ | ... | $S_{p,t}$ |
|---|---|---|---|---|---|---|---|---|---|---|---|---|
| : | : | : | : | : | : | : | : | : | : | : | | : |
| $S_{1,6}$ | $S_{2,6}$ | $S_{3,6}$ | $S_{4,6}$ | $S_{5,6}$ | $S_{6,6}$ | $S_{7,6}$ | $S_{8,6}$ | $S_{9,6}$ | $S_{10,6}$ | $S_{11,6}$ | ... | $S_{p,6}$ |
| $S_{1,5}$ | $S_{2,5}$ | $S_{3,5}$ | $S_{4,5}$ | $S_{5,5}$ | $S_{6,5}$ | $S_{7,5}$ | $S_{8,5}$ | $S_{9,5}$ | $S_{10,5}$ | $S_{11,5}$ | ... | $S_{p,5}$ |
| $S_{1,4}$ | $S_{2,4}$ | $S_{3,4}$ | $S_{4,4}$ | $S_{5,4}$ | $S_{6,4}$ | $S_{7,4}$ | $S_{8,4}$ | $S_{9,4}$ | $S_{10,4}$ | $S_{11,4}$ | ... | $S_{p,4}$ |
| $S_{1,3}$ | $S_{2,3}$ | $S_{3,3}$ | $S_{4,3}$ | $S_{5,3}$ | $S_{6,3}$ | $S_{7,3}$ | $S_{8,3}$ | $S_{9,3}$ | $S_{10,3}$ | $S_{11,3}$ | ... | $S_{p,3}$ |
| $S_{1,2}$ | $S_{2,2}$ | $S_{3,2}$ | $S_{4,2}$ | $S_{5,2}$ | $S_{6,2}$ | $S_{7,2}$ | $S_{8,2}$ | $S_{9,2}$ | $S_{10,2}$ | $S_{11,2}$ | ... | $S_{p,2}$ |
| $S_{1,1}$ | $S_{2,1}$ | $S_{3,1}$ | $S_{4,1}$ | $S_{5,1}$ | $S_{6,1}$ | $S_{7,1}$ | $S_{8,1}$ | $S_{9,1}$ | $S_{10,1}$ | $S_{11,1}$ | ... | $S_{p,1}$ |
| $CH_1$ | $CH_2$ | $CH_3$ | $CH_4$ | $CH_5$ | $CH_6$ | $CH_7$ | $CH_8$ | $CH_9$ | $CH_{10}$ | $CH_{11}$ | ... | $CH_p$ |

| $P_{1,1}$ | $P_{1,2}$ | $P_{1,3}$ | $P_{1,4}$ | $P_{1,5}$ | $P_{1,6}$ | $P_{1,7}$ | $P_{1,8}$ | $P_{1,9}$ | ... | $P_{1,N}$ |
|---|---|---|---|---|---|---|---|---|---|---|
| $P_{2,1}$ | $P_{2,2}$ | $P_{2,3}$ | $P_{2,4}$ | $P_{2,5}$ | $P_{2,6}$ | $P_{2,7}$ | $P_{2,8}$ | $P_{2,9}$ | ... | $P_{2,N}$ |
| $P_{3,1}$ | $P_{3,2}$ | $P_{3,3}$ | $P_{3,4}$ | $P_{3,5}$ | $P_{3,6}$ | $P_{3,7}$ | $P_{3,8}$ | $P_{3,9}$ | ... | $P_{3,N}$ |
| $P_{4,1}$ | $P_{4,2}$ | $P_{4,3}$ | $P_{4,4}$ | $P_{4,5}$ | $P_{4,6}$ | $P_{4,7}$ | $P_{4,8}$ | $P_{4,9}$ | ... | $P_{4,N}$ |
| $P_{5,1}$ | $P_{5,2}$ | $P_{5,3}$ | $P_{5,4}$ | $P_{5,5}$ | $P_{5,6}$ | $P_{5,7}$ | $P_{5,8}$ | $P_{5,9}$ | ... | $P_{5,N}$ |
| $P_{6,1}$ | $P_{6,2}$ | $P_{6,3}$ | $P_{6,4}$ | $P_{6,5}$ | $P_{6,6}$ | $P_{6,7}$ | $P_{6,8}$ | $P_{6,9}$ | ... | $P_{6,N}$ |
| $P_{7,1}$ | $P_{7,2}$ | $P_{7,3}$ | $P_{7,4}$ | $P_{7,5}$ | $P_{7,6}$ | $P_{7,7}$ | $P_{7,8}$ | $P_{7,9}$ | ... | $P_{7,N}$ |
| : | : | : | : | : | : | : | : | : | | : |
| $P_{M,1}$ | $P_{M,2}$ | $P_{M,3}$ | $P_{M,4}$ | $P_{M,5}$ | $P_{M,6}$ | $P_{M,7}$ | $P_{M,8}$ | $P_{M,9}$ | ... | $P_{M,N}$ |

|   |   |   |   |   |   |   |   |   |   |
|---|---|---|---|---|---|---|---|---|---|
| $S_{6,4}$ |   |   |   |   |   |   |   |   |   |
| $S_{6,3}$ $S_{6,4}$ | $S_{6,3}$ $S_{6,4}$ |   |   |   |   |   |   | $S_{6,3}$ $S_{6,4}$ |   |
|   | $S_{6,3}$ $S_{6,4}$ | $S_{6,3}$ $S_{6,4}$ | $S_{6,3}$ $S_{6,4}$ | $S_{6,3}$ | $S_{6,3}$ | $S_{6,3}$ | $S_{6,3}$ | $S_{6,3}$ $S_{6,4}$ | ... |
|   |   | $S_{6,4}$ | $S_{6,4}$ | $S_{6,4}$ | $S_{6,4}$ | $S_{6,4}$ | $S_{6,4}$ |   |   |
|   |   |   |   |   |   |   |   |   |   |
|   |   |   |   |   |   |   |   |   |   |
|   |   |   |   |   |   |   |   |   |   |
|   |   |   |   |   |   |   |   |   |   |

| $S_{1,t}$ | $S_{2,t}$ | $S_{3,t}$ | $S_{4,t}$ | $S_{5,t}$ | $S_{6,t}$ | $S_{7,t}$ | $S_{8,t}$ | $S_{9,t}$ | $S_{10,t}$ | $S_{11,t}$ | ... | $S_{p,t}$ |
|---|---|---|---|---|---|---|---|---|---|---|---|---|
| : | : | : | : | : | : | : | : | : | : | : |  | : |
| $S_{1,6}$ | $S_{2,6}$ | $S_{3,6}$ | $S_{4,6}$ | $S_{5,6}$ | $S_{6,6}$ | $S_{7,6}$ | $S_{8,6}$ | $S_{9,6}$ | $S_{10,6}$ | $S_{11,6}$ | ... | $S_{p,6}$ |
| $S_{1,5}$ | $S_{2,5}$ | $S_{3,5}$ | $S_{4,5}$ | $S_{5,5}$ | $S_{6,5}$ | $S_{7,5}$ | $S_{8,5}$ | $S_{9,5}$ | $S_{10,5}$ | $S_{11,5}$ | ... | $S_{p,5}$ |
| $S_{1,4}$ | $S_{2,4}$ | $S_{3,4}$ | $S_{4,4}$ | $S_{5,4}$ | $S_{6,4}$ | $S_{7,4}$ | $S_{8,4}$ | $S_{9,4}$ | $S_{10,4}$ | $S_{11,4}$ | ... | $S_{p,4}$ |
| $S_{1,3}$ | $S_{2,3}$ | $S_{3,3}$ | $S_{4,3}$ | $S_{5,3}$ | $S_{6,3}$ | $S_{7,3}$ | $S_{8,3}$ | $S_{9,3}$ | $S_{10,3}$ | $S_{11,3}$ | ... | $S_{p,3}$ |
| $S_{1,2}$ | $S_{2,2}$ | $S_{3,2}$ | $S_{4,2}$ | $S_{5,2}$ | $S_{6,2}$ | $S_{7,2}$ | $S_{8,2}$ | $S_{9,2}$ | $S_{10,2}$ | $S_{11,2}$ | ... | $S_{p,2}$ |
| $S_{1,1}$ | $S_{2,1}$ | $S_{3,1}$ | $S_{4,1}$ | $S_{5,1}$ | $S_{6,1}$ | $S_{7,1}$ | $S_{8,1}$ | $S_{9,1}$ | $S_{10,1}$ | $S_{11,1}$ | ... | $S_{p,1}$ |
| $CH_1$ | $CH_2$ | $CH_3$ | $CH_4$ | $CH_5$ | $CH_6$ | $CH_7$ | $CH_8$ | $CH_9$ | $CH_{10}$ | $CH_{11}$ | ... | $CH_p$ |

| $P_{1,1}$ | $P_{1,2}$ | $P_{1,3}$ | $P_{1,4}$ | $P_{1,5}$ | $P_{1,6}$ | $P_{1,7}$ | $P_{1,8}$ | $P_{1,9}$ | ... | $P_{1,N}$ |
|---|---|---|---|---|---|---|---|---|---|---|
| $P_{2,1}$ | $P_{2,2}$ | $P_{2,3}$ | $P_{2,4}$ | $P_{2,5}$ | $P_{2,6}$ | $P_{2,7}$ | $P_{2,8}$ | $P_{2,9}$ | ... | $P_{2,N}$ |
| $P_{3,1}$ | $P_{3,2}$ | $P_{3,3}$ | $P_{3,4}$ | $P_{3,5}$ | $P_{3,6}$ | $P_{3,7}$ | $P_{3,8}$ | $P_{3,9}$ | ... | $P_{3,N}$ |
| $P_{4,1}$ | $P_{4,2}$ | $P_{4,3}$ | $P_{4,4}$ | $P_{4,5}$ | $P_{4,6}$ | $P_{4,7}$ | $P_{4,8}$ | $P_{4,9}$ | ... | $P_{4,N}$ |
| $P_{5,1}$ | $P_{5,2}$ | $P_{5,3}$ | $P_{5,4}$ | $P_{5,5}$ | $P_{5,6}$ | $P_{5,7}$ | $P_{5,8}$ | $P_{5,9}$ | ... | $P_{5,N}$ |
| $P_{6,1}$ | $P_{6,2}$ | $P_{6,3}$ | $P_{6,4}$ | $P_{6,5}$ | $P_{6,6}$ | $P_{6,7}$ | $P_{6,8}$ | $P_{6,9}$ | ... | $P_{6,N}$ |
| $P_{7,1}$ | $P_{7,2}$ | $P_{7,3}$ | $P_{7,4}$ | $P_{7,5}$ | $P_{7,6}$ | $P_{7,7}$ | $P_{7,8}$ | $P_{7,9}$ | ... | $P_{7,N}$ |
| : | : | : | : | : | : | : | : | : |  | : |
| $P_{M,1}$ | $P_{M,2}$ | $P_{M,3}$ | $P_{M,4}$ | $P_{M,5}$ | $P_{M,6}$ | $P_{M,7}$ | $P_{M,8}$ | $P_{M,9}$ | ... | $P_{M,N}$ |

UI

ULTRASOUND SYSTEM AND METHOD FOR PROCESSING BEAM-FORMING BASED ON SAMPLING DATA

CROSS-REFERENCE TO RELATED APPLICATION

The present application claims priority from Korean Patent Application No. 10-2010-0129665 filed on Dec. 17, 2010, the entire subject matter of which is incorporated herein by reference.

TECHNICAL FIELD

The present invention generally relates to ultrasound systems, and more particularly to a beam forming processing based on sampling data in an ultrasound system.

BACKGROUND

An ultrasound system has become an important and popular diagnostic tool since it has a wide range of applications. Specifically, due to its non-invasive and non-destructive nature, the ultrasound system has been extensively used in the medical profession. Modern high-performance ultrasound systems and techniques are commonly used to produce two or three-dimensional images of internal features of an object (e.g., human organs).

The ultrasound system is configured to transmit an ultrasound signal to a target object and receive an ultrasound signal reflected from the target object (i.e., ultrasound echo signal) to thereby form a receive signal. The ultrasound system is further configured to perform an analog-to-digital conversion upon the receive signal to form sampling data and perform beam forming processing upon the sampling data to thereby form receive-focused data. The ultrasound system is further configured to form an ultrasound image by using the receive-focused data.

As the processing speed of a central processing unit (CPU) becomes faster, the software beam forming processing, which is performed in CPU, has been adopted. Currently, a pixel-oriented beam forming technique, which is a popular technique among the software beam forming techniques, is implemented by extracting sampling data corresponding to a path length for the respective transducers for pixels of an ultrasound image to be formed and performing beam forming processing (i.e., summing) upon the extracted sampling data. This pixel-oriented beam forming technique is characterized by a low amount of computation and easy implementation. However, in such a technique, there is a problem since a noise pattern caused by the pixel-oriented beam forming technique may affect the resolution of an ultrasound image.

SUMMARY

Embodiments of performing a beam forming processing based on sampling data in an ultrasound system are disclosed. The ultrasound system includes an ultrasound data acquisition unit configured to form a receive signal based on an ultrasound signal reflected from a target object, perform an analog-to-digital conversion on the receive signal to form sampling data, select pixels, which the respective sampling data are used as pixel values thereof among the plurality of pixels, cumulatively assign the corresponding sampling data to the selected pixels and perform beam forming upon the cumulatively assigned sampling data for the respective pixels to form receive-focused data.

In another embodiment, a method of forming an ultrasound image having a plurality of pixels, comprises: a) transmitting an ultrasound signal to a target object and receiving an ultrasound echo signal reflected from the target object to form a receive signal by using an ultrasound probe having a plurality of transducer elements; b) performing an analog-to-digital conversion on the receive signal to form sampling data; c) selecting pixels, which the respective sampling data are used as pixel values thereof among the plurality of pixels, and cumulatively assigning the corresponding sampling data to the selected pixels; and d) performing beam forming upon the cumulatively assigned sampling data for the respective pixels to form receive-focused data.

The Summary is provided to introduce a selection of concepts in a simplified form that are further described below in the Detailed Description. This Summary is not intended to identify key or essential features of the claimed subject matter, nor is it intended to be used in determining the scope of the claimed subject matter.

BRIEF DESCRIPTION OF THE DRAWINGS

FIG. 3 is an exemplary diagram showing sampling data and pixels of an ultrasound image.

FIGS. 4 to 7 are diagrams showing an example of performing sampling data-oriented beam forming processing in accordance with a first embodiment of the present invention.

FIG. 9 is an exemplary diagram showing an example of setting a sampling data set in accordance with a third embodiment of the present invention.

DETAILED DESCRIPTION

Hereinafter, embodiments of the present invention will be described by referring to the accompanying drawings.

Figure 1:
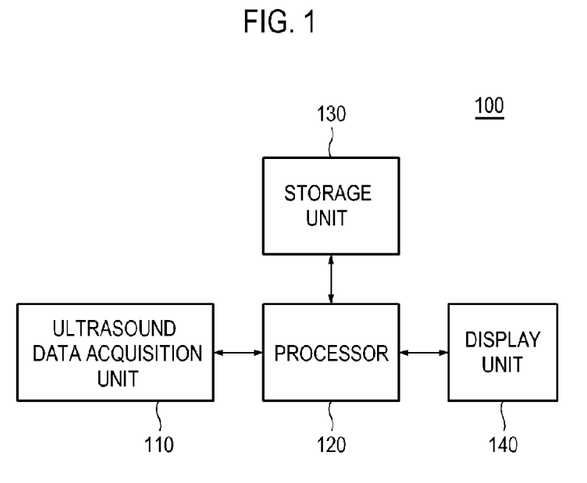
FIG. 1 is a block diagram showing an illustrative embodiment of an ultrasound system.

FIG. 1 is a block diagram showing an illustrative embodiment of an ultrasound system. Referring to FIG. 1, the ultrasound system 100 includes an ultrasound data acquisition unit 110, a processor 120, a storage unit 130 and a display unit 140.

The ultrasound data acquisition unit 110 is configured to transmit an ultrasound signal to a target object and receive an ultrasound signal reflected from the target object (i.e., ultrasound echo signal) to thereby acquire ultrasound data.

Figure 2:
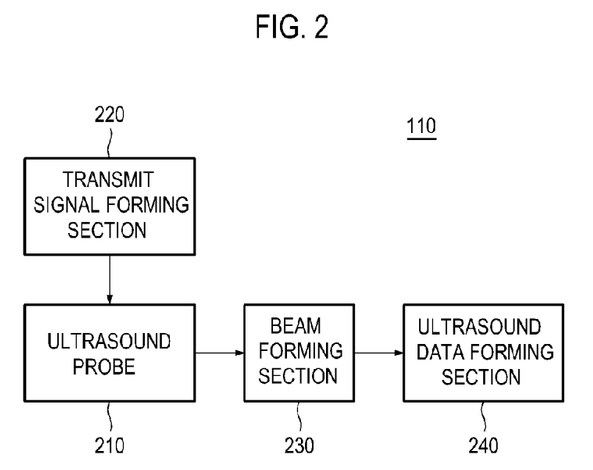
FIG. 2 is a block diagram showing an illustrative embodiment of an ultrasound data acquisition unit.

FIG. 2 is a block diagram showing an illustrative embodiment of the ultrasound data acquisition unit 110. Referring to FIG. 2, the ultrasound data acquisition unit 100 may include an ultrasound probe 210, a transmit signal forming section 220, a beam forming section 230 and an ultrasound data forming section 240.

The ultrasound probe 210 includes a plurality of transducer elements, which are configured to perform reciprocal conversion between an electrical signal and an ultrasound signal. The ultrasound probe 210 is configured to transmit an ultrasound beam along each of multiple scan lines and receive an ultrasound echo signal from the target object to thereby form a receive signal. In one embodiment, the receive signal may be an analog signal. The ultrasound probe 210 includes at least one of a convex probe, a linear probe and the like.

The transmit signal forming section 220 is configured to control transmission of the ultrasound signal. Also, the transmit signal forming section 220 is configured to generate transmit signals to obtain an ultrasound image by considering the transducers and focal points. If the transmit signals are provided from the transmit signal forming section 220, then the ultrasound probe 210 may be operable to convert the transmit signal into an ultrasound signal, which is propagated into the target object, and receive an ultrasound echo signal to thereby form a receive signal.

The beaming section 230 is configured to perform analog-to-digital conversion upon the receive signal, which is provided from the ultrasound probe 210, to form sampling data. Also, the beam forming section 230 is further configured to perform software beam forming upon the sampling data in consideration of the transducer elements and focal points to form receive-focusing data according to one embodiment of the present invention.

According to a first embodiment of the present invention, the beam forming section 230 is configured to perform analog-to-digital conversion upon the receive signals, which are provided trough a plurality of channels $CH_k$, wherein $1 \leq k \leq N$, from the ultrasound probe 210 to form sampling data $S_{i,j}$, wherein i and j are a positive integer. The sampling data $S_{i,j}$ may be stored in the storage unit 130. The beam forming section 230 may determine positions of a plurality of pixels of an ultrasound image to be formed. The beam forming section 230 is configured to select pixels, which the respective sampling data are used as pixel data thereof, based on locations of the transducer elements and orientations of the respective pixels with respect to the transducer elements. That is, the beam forming section 230 is configured to select the pixels, which the respective sampling data are used as pixel data thereof, during the beam forming processing, based on the locations of the transducer elements and orientations of the respective pixels with respect to the transducer elements. The beam forming section 230 may be configured to assign sampling data corresponding to the selected pixels as pixel data in a cumulative manner.

Figure 4:
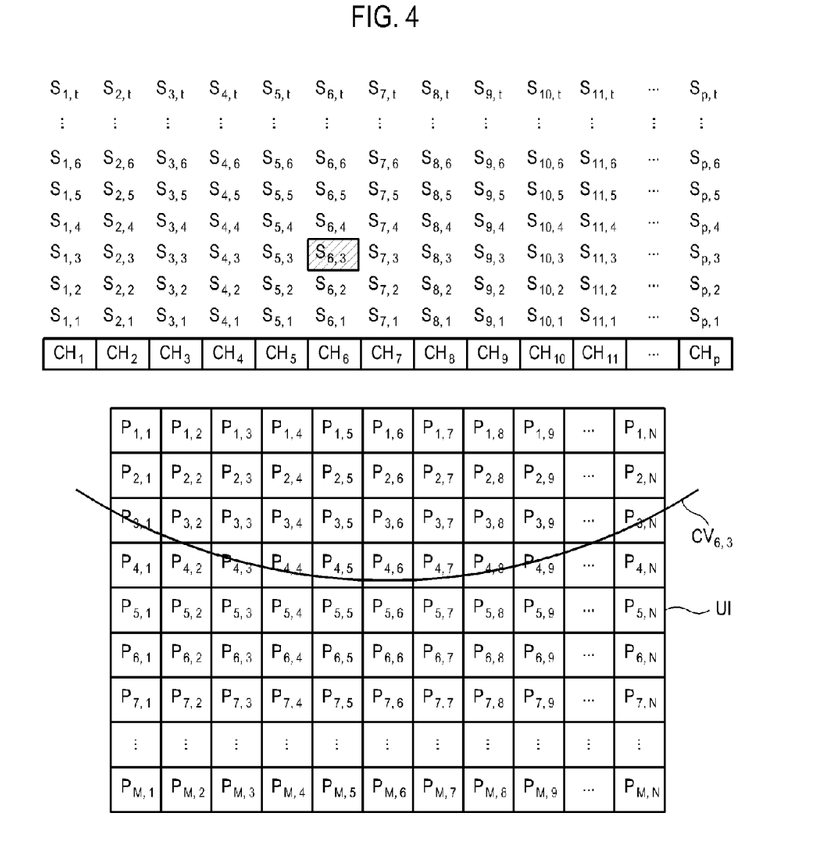
Figure 5:
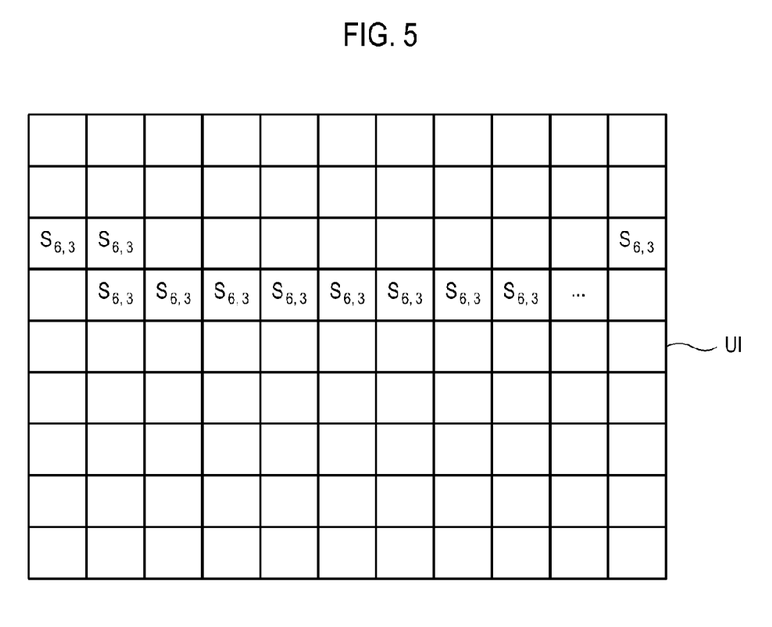
Figure 7:
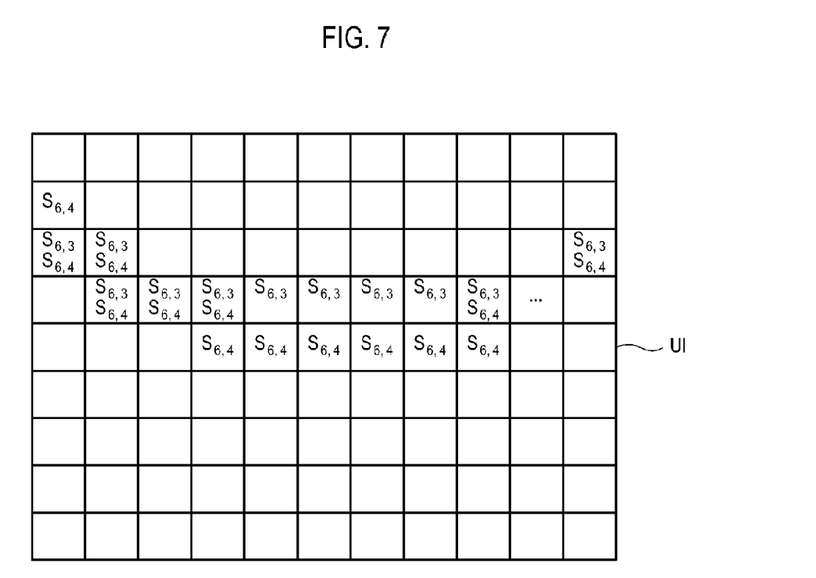

In one embodiment, the beam forming section 230 is configured to set a curve $CV_{6,3}$ to select pixels, which the sample data $S_{6,3}$ are used as pixel data thereof, during the beam forming processing (hereinafter, referred to as "beam forming curve") based on the locations of the transducer elements and orientations of the respective pixels with respect to the transducer elements, as shown in FIG. 4. The beam forming section 230 is configured to select pixels $P_{3,1}, P_{3,2}, P_{4,3}, P_{4,4}, P_{4,5}, P_{4,6}, P_{4,7}, P_{4,8}, P_{4,9}, \ldots P_{3,N}$ on which the beam forming curve $CV_{6,3}$ passes among the pixels $P_{a,b}$ of the ultrasound image UI, wherein $1 \leq a \leq M$, $1 \leq b \leq N$. The beam forming section 230 is configured to assign the sampling data $S_{6,3}$ to the selected pixies $P_{3,1}, P_{3,2}, P_{4,3}, P_{4,4}, P_{4,5}, P_{4,6}, P_{4,7}, P_{4,8}, P_{4,9}, \ldots P_{3,N}$, as shown in FIG. 5. Thereafter, the beam forming section 230 is configured to set a beam forming curve $CV_{6,4}$ to select pixels, which the sample data $S_{6,4}$ are used as pixel data thereof during the beam forming processing, based on the locations of the transducer elements and orientations of the respective pixels with respect to the transducer elements, as shown in FIG. 6. The beam forming section 230 is configured to select pixels $P_{2,1}, P_{3,2}, P_{4,2}, P_{4,3}, P_{4,4}, P_{5,4}, P_{5,5}, P_{5,6}, P_{5,7}, P_{5,8}, P_{4,9}, P_{5,9}, \ldots, P_{3,N}$ on which the beam forming curve $CV_{6,4}$ passes among the pixels $P_{a,b}$ of the ultrasound image UI. As shown in FIG. 7, the sampling data $S_{6,4}$ are assigned to the pixels $P_{2,1}, P_{3,2}, P_{4,2}, P_{4,3}, P_{4,4}, P_{5,4}, P_{5,5}, P_{5,6}, P_{5,7}, P_{5,8}, P_{4,9}, P_{5,9}, \ldots, P_{3,N}$. In this way, the respective sampling data, which are used as the pixel data, are cumulatively assigned to the pixels as pixel data.

The beam forming section 230 is configured to perform beam forming processing (i.e., summing) upon the cumulatively assigned sampling data to the respective pixels $P_{a,b}$ of the ultrasound image UI to thereby form receive-focused data.

In a second embodiment of the present invention, the beam forming section 230 is configured to perform analog-to-digital conversion upon the receive signals, which are provided trough a plurality of channels $CH_k$, wherein $1 \leq k \leq N$, from the ultrasound probe 210 to form sampling data $S_{i,j}$, wherein i and j are positive integer. The sampling data $S_{i,j}$ may be stored in the storage unit 130. The beam forming section 230 may determine locations of a plurality of pixels of an ultrasound image to be formed. The beam forming section 230 is configured to select pixels, which the respective sampling data are used as pixel data thereof, based on locations of the transducer elements and orientations of the respective pixels with respect to the transducer elements. That is, the beam forming section 230 is configured to detect the pixels, which the respective sampling data are used as pixel data thereof during the beam forming process, based on the locations of the transducer elements and orientations of the respective pixels with respect to the transducer elements. The beam forming section 230 may assign sampling data corresponding to the detected pixels as pixel data in a cumulative manner. The beam forming section is further configured to determine pixels existing in the same column among the selected pixels and set weights corresponding to the respective determined pixels. The beam forming section is further configured to apply the weights to the respective pixels.

Figure 8:
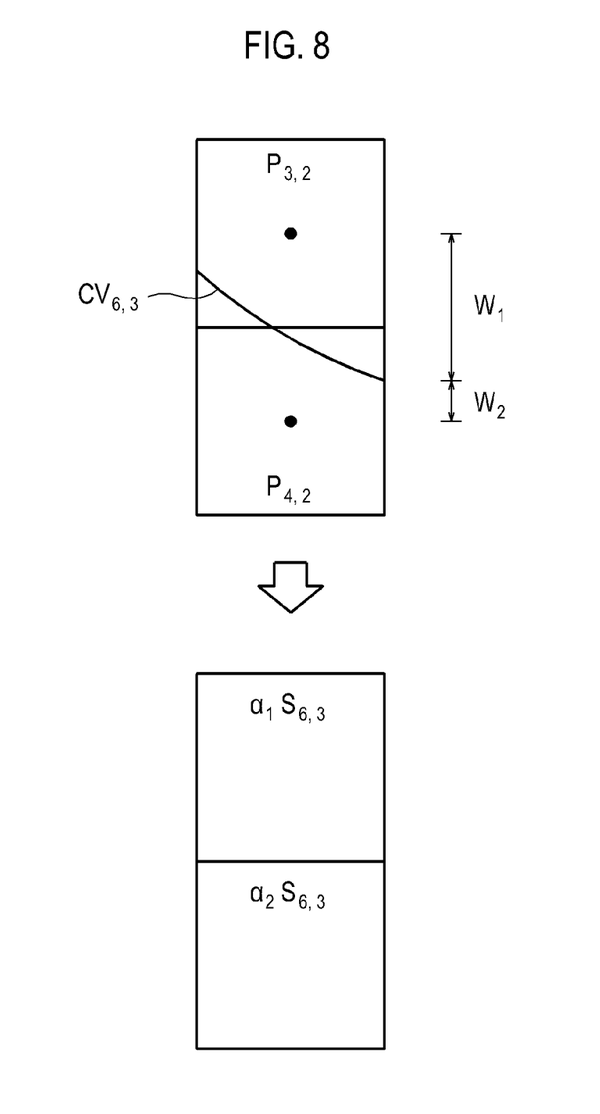
FIG. 8 is an exemplary diagram showing an example of setting weights in accordance with a second embodiment of the present invention.

In one embodiment, the beam forming section 230 is configured to set a curve $CV_{6,3}$ to select pixels, which the sample data $S_{6,3}$ are used as pixel data thereof during the beam forming processing (hereinafter, referred to as "beam forming curve"), based on the locations of the transducer elements and orientations of the respective pixels of the ultrasound image with respect to the transducer elements, as shown in FIG. 4. The beam forming section 230 is configured to select pixels $P_{3,1}, P_{3,2}, P_{4,3}, P_{4,4}, P_{4,5}, P_{4,6}, P_{4,7}, P_{4,8}, P_{4,9}, \ldots P_{3,N}$ on which the beam forming curve $CV_{6,3}$ passes among the pixels $P_{a,b}$ of the ultrasound image UI, wherein $1 \leq a \leq M$, $1 \leq b \leq N$. The beam forming section 230 is configured to assign the sampling data $S_{6,3}$ to the selected pixels $P_{3,1}, P_{3,2}, P_{4,3}, P_{4,4}, P_{4,5}, P_{4,6}, P_{4,7}, P_{4,8}, P_{4,9}, \ldots P_{3,N}$, as shown in FIG. 5. The beam forming section 230 is configured to determine pixels $P_{3,2}$ and $P_{4,2}$, which exist in the same column among the selected pixels $P_{3,1}, P_{3,2}, P_{4,3}, P_{4,4}, P_{4,5}, P_{4,6}, P_{4,7}, P_{4,8}, P_{4,9}, \ldots P_{3,N}$. As illustrated in FIG. 8, the beam forming section 230 is configured to compute distances $W_1$ and $W_2$ from a center of each of the pixels $P_{3,2}$ and $P_{4,2}$, which exist in the same column, to the beam forming curve $CV_{6,3}$ and set a first weight $\alpha_1$ corresponding to the pixel $P_{3,2}$ based on the distance $W_1$ and a second weight $\alpha_2$ corresponding to the pixel $P_{4,2}$ based on the distance $W_2$. The first and second weights $\alpha_1$ and $\alpha_2$ may be set to be in proportion to or in inverse proportion to the computed distances. The beam forming section 230 is configured to apply the first weight $\alpha_1$ to the sampling data $S_{6,3}$ assigned to the pixel $P_{3,2}$ and to apply the second weight $\alpha_2$ to the sampling data $S_{6,3}$ assigned to the pixel $P_{4,2}$. The beam forming second 230 is configured to perform the above process upon the remaining sampling data.

The beam forming section 230 is configured to perform beam forming processing (i.e., summing) upon the cumulatively assigned sampling data to the respective pixels $P_{a,b}$ of the ultrasound image UI to thereby form receive-focused data.

According to a third embodiment of the present invention, the beam forming section 230 is configured to perform analog-to-digital conversion upon the receive signals, which are provided trough a plurality of channels $CH_k$, wherein $1 \leq k \leq N$, from the ultrasound probe 210 to form sampling data $S_{i,j}$, wherein i and j are positive integer. The sampling data $S_{i,j}$ may be stored in the storage unit 130. The beam forming section 230 is configured to set a sampling data set to select pixels using sampling data $S_{i,j}$ during a beam forming process.

In one embodiment, the beam forming section 230 is configured to set a sampling data set of $S_{1,1}$, $S_{1,4}$, ..., $S_{1,t}$, $S_{2,1}$, $S_{2,4}$, ..., $S_{2,t}$ ... $S_{p,t}$ (denoted by a box) to select pixels, which the sampling data $S_{i,j}$ are used as pixel data thereof during the beam forming process, as shown in FIG. 9.

The beam forming section 230 is configured to select pixels, which the respective sample data of the sampling data set are used as pixel data thereof during the beam forming processing, based on the locations of the transducer elements and orientations of the respective pixels of the ultrasound image with respect to the transducer elements. The beam forming section 230 is further configured to cumulatively assign the sampling data to the selected pixels in the same manner with the first embodiment or the second embodiment. The beam forming section 230 is further configured to perform beam forming processing upon the sampling data, which are cumulatively assigned to each of the pixels of the ultrasound image, to thereby form receive-focused data.

According to a fourth embodiment, the beam forming section 230 is configured to perform down sampling upon the receive signal, which is provided through a plurality of channels from the probe 210, to form down-sampled sampling data. As described above, the beam forming section 230 is configured to select the pixels corresponding to the respective sampling data. That is, the beam forming section 230 is configured to select the pixels, which the respective sampling data are used as the pixel values thereof during the beam forming processing, based on the locations of the transducers and the orientations of the pixels of the ultrasound image with respect to the ultrasound probe. The beam forming section 230 is further configured to cumulatively assign the respective sampling data to the selected pixels in the same manner of the first embodiment or the second embodiment. The beam forming section 230 is further configured to perform beam forming processing upon the sampling data, which are cumulatively assigned to the respective pixels, to form receive-focused data.

The ultrasound data forming section 240 is configured to form ultrasound data corresponding to the ultrasound image by using the receive-focused data, which are provided from the beam forming section 230. The ultrasound data may be radio frequency data, however, it may be not limited thereto. Also, the ultrasound data forming section 240 is further configured to perform a variety of data processing (e.g., gain adjustment, etc.), which is necessary for forming the ultrasound data, upon the receive-focused data.

Referring back to FIG. 1, the processor 120 is coupled to the ultrasound data acquisition unit 110. The processor 120 may include a central processing unit, a microprocessor, a graphic processing unit and the like.

The storage unit 130 is configured to store the sampling data formed in the ultrasound data acquisition unit 110. Also, the storage unit 130 is further configured to store the ultrasound data acquired in the ultrasound data acquisition unit 110.

The display unit 140 is configured to display the ultrasound image formed in the processor 120. The display unit 140 may include a liquid crystal display, an organic light emitting diodes and the like.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An ultrasound system for forming an ultrasound image, comprising:
   an ultrasound data acquisition unit including a plurality of transducer elements and configured to:
   form a receive signal based on an ultrasound signal reflected from a target object,
   perform analog-to-digital conversion on the receive signal to form sampling data,
   set a beam forming curve to select pixels, among a plurality of pixels, that correspond to a portion of the sampling data, based on locations of respective ones of the transducer elements and orientations of respective ones of regions of the target object, corresponding to pixels with respect to the transducer elements during beam forming,
   select pixels on which the beam forming curve passes,
   assign the corresponding portion of the sampling data to the selected pixels,
   apply weights to the assigned sampling data, and
   perform the beam forming upon the assigned sampling data for respective ones of the plurality of pixels to form receive-focused data.

2. The ultrasound system of claim 1, wherein the ultrasound data acquisition unit includes:
   a transmit signal forming section configured to form transmit signals to acquire the ultrasound image; and
   an ultrasound probe including the plurality of transducer elements and operable to transmit an ultrasound signal to the target object in response to the transmit signals and output the receive signal in response to an ultrasound echo signal reflected from the target object.

3. The ultrasound system of claim 2, wherein the ultrasound data acquisition unit is further configured to set a sampling data set to select the pixels such that the corresponding portion of the sampling data are used as the pixel values of the selected pixels, among the sampling data during the beam forming.

4. The ultrasound system of claim 2, wherein the ultrasound data acquisition unit is further configured to perform down sampling upon the receive signal to form down-sampled sampling data.

5. The ultrasound system of claim 2, wherein the ultrasound data acquisition unit is further configured to:
   determine pixels existing in a same column among the selected pixels,
   set weights corresponding to the respective determined pixels, and
   apply the weights to the sampling data assigned to the corresponding pixels.

6. The ultrasound system of claim 5, wherein the ultrasound data acquisition unit is further configured to compute distances between centers of the determined pixels and the beam forming curve, and apply the weights based on the computed distances.

7. The ultrasound system of claim 6, wherein the weights are set in proportion to or in inverse proportion to the computed distances.

8. An ultrasound system for forming an ultrasound image, comprising:
- an ultrasound data acquisition unit including a plurality of transducer elements and configured to:
- form a first receive signal based on an ultrasound signal reflected from a first set of regions, among a plurality of regions of a target object,
- perform analog-to-digital conversion on the first receive signal to form first sampling data corresponding to a particular one of the plurality of transducer elements,
- form a second receive signal based on an ultrasound signal reflected from a second set of regions, among the plurality of regions of the target object,
- perform analog-to-digital conversion on the second receive signal to form second sampling data corresponding to the particular transducer element,
- set a first beam forming curve on a plurality of pixels that correspond to the plurality of regions, such that the first beam forming curve passes on pixels, among the plurality of pixels, that correspond to the first set of regions,
- select a first set of pixels on which the first beam forming curve passes,
- assign the first sampling data to the first set of pixels as pixel values of the first set of pixels,
- set a second beam forming curve on the plurality of pixels that correspond to the plurality of regions, such that the second beam forming curve passes on pixels, among the plurality of pixels, that correspond to the second set of regions,
- select a second set of pixels on which the second beam forming curve passes,
- assign the second sampling data to the second set of pixels as pixel values of the first set of pixels,
- apply weights to the first sampling data and the second sampling data, and
- perform beam forming upon the assigned first sampling data and the assigned second sampling data for the first set of pixels and the second set of pixels, respectively, to form receive-focused data.

* * * * *